United States Patent [19]

Sullivan et al.

[11] Patent Number: 6,155,196

[45] Date of Patent: Dec. 5, 2000

[54] MULTI-DEPTH ACOUSTIC SIGNAL GENERATING DEVICE

[75] Inventors: Edmund J. Sullivan, Portsmouth, R.I.; Robert W. Gauthier, Assonet, Mass.

[73] Assignee: The United States of America as represented by the Secretary of the Navy, Washington, D.C.

[21] Appl. No.: 09/337,221

[22] Filed: Jun. 7, 1999

[51] Int. Cl.[7] .................................................. G01C 19/00
[52] U.S. Cl. .............................. 116/70; 116/27; 367/141
[58] Field of Search ................................. 116/70, 27, 26, 116/200, 201, 209, 264, 266, 112, 268, 271, 272, DIG. 7; 367/141–143, 146, 148, 131, 910; 181/139, 142; 340/850

[56] References Cited

U.S. PATENT DOCUMENTS

| | | | |
|---|---|---|---|
| 2,892,436 | 6/1959 | Hay ........................................ | 116/112 |
| 3,053,220 | 9/1962 | Sawyer .................................... | 367/142 |
| 3,137,835 | 6/1964 | Bielecki .................................. | 367/142 |
| 3,194,207 | 7/1965 | Dunne ..................................... | 116/27 |
| 3,229,404 | 1/1966 | Abrahamsen et al. ................... | 367/142 |
| 3,433,202 | 3/1969 | Sharp et al. ............................. | 116/27 |
| 3,560,913 | 2/1971 | Copley .................................... | 367/141 |
| 3,672,300 | 6/1972 | Axelson et al. ...................... | 116/137 R |
| 3,741,333 | 6/1973 | Muniz et al. ........................ | 116/137 R |
| 4,095,667 | 6/1978 | Mahig et al. ........................... | 367/144 |
| 4,312,054 | 1/1982 | Holand .................................... | 367/142 |
| 5,233,570 | 8/1993 | Donskoy ................................. | 367/142 |

*Primary Examiner*—Andrew H. Hirshfeld
*Attorney, Agent, or Firm*—Michael J. McGowan; Robert W. Gauthier; Prithvi C. Lall

[57] ABSTRACT

A simple mechanical device is provided which generates acoustic signals at one or more specified depths. The device consists of a spring loaded piston placed in a wall of a housing, the spring loading biasing the piston away from the housing. The piston is subjected to a pressure differential between the exterior and interior of the housing such that the piston moves against the spring force and into the housing as the pressure differential, corresponding to a depth of the housing beneath a water surface, increases. As the piston moves further into the housing, it contacts a series of latches, each latch being used to detain spring loaded striker. The latches are spaced along the travel path of the piston such that each striker is associated with a specific piston movement, or depth. When the piston contacts a latch, the striker is released and strikes against a ledge within the housing, creating one of the acoustic signals.

15 Claims, 4 Drawing Sheets

MULTI-DEPTH ACOUSTIC SIGNAL GENERATING DEVICE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to acoustic signal generating devices, and more particularly to a mechanical device capable of generating an acoustic signal at one or more varying depths.

(2) Description of the Prior Art

Acoustic signals in active sonobuoys are produced by an array of active transducers that are driven electronically by means of a signal generator, a power source and an electric driver stage. The power source provides the necessary power to operate the signal generator and the electronic driver. Typically, the power source is a battery. The signal generator produces a specified signal and passes the signal to the driver stage where it is amplified so as to drive the active transducer array. The array produces the acoustic signal which is propagated through the water. Such electronically driven generators are complex, costly and have suffered from being unreliable. A simplified mechanically driven generator can reduce cost and can be made more reliable.

However, prior art mechanical sound generators are also typically complex, often relying on compressed gas or motors to actuate a striker against a plate. For example, U.S. Pat. No. 3,433,202 to Sharp et al. discloses an impact energized sound source which uses compressed gas to propel a striker through an evacuated guide tube and against a radiating plate. U.S. Pat. No. 3,137,835 to Bielecki et al. discloses an underwater mechanical sound generator resulting from the movement of motor driven pistons within the device. U.S. Pat. No. 3,053,220 to Sawyer discloses an underwater impact sound source having a dual spring-loaded impact rod. A free floating striker is attached to the rod while the springs and impact rod are each are mounted on telescoping tubes, all adding to the devices complexity. Also, the Sawyer device makes no provision for actuating the device at a specific depth. Other, similarly complex, and/or non-depth sensitive devices are disclosed by Abrahamsen et al. and Donsky in U.S. Pat. Nos. 3,229,404 and 5,233,570, respectively. In abandoned application Ser. No. 07/904,626, current inventor Sullivan disclosed a mechanical sound generator including a pressure sensitive piston which acted against two rods fixed end to end. The separation of the rods by the piston allowed a spring activated piston to strike a ledge, causing the acoustic signal. As the rods were fixed end to end, there was a distinct possibility that jarring of the device would cause premature actuation, especially as the device may be dropped into the water from a considerable distance. Also, the end to end configuration could lead to assembly problems when trying to align the rod ends. Occasionally, there is also a need to provide multiple acoustic signals at varying depths, e.g. in testing sonar array tracking, or to provide for varying the depth at which a signal is to be generated. In order to adjust the depth with the sound generator of the previously mentioned abandoned application, a shear pin component needs to be replaced. A simple mechanical device which can be easily adjusted to provide acoustic signals at varying depths would be less costly than a comparable electronic signal generator and provide greater flexibility than the previous mechanical sound generators.

SUMMARY OF THE INVENTION

Accordingly, it is an object of the present invention to provide a simple mechanical device which can generate an acoustic signal at a specified depth.

Another object of the present invention is to provide a device which is not susceptible to premature actuation when jarred.

Still another object of the present invention is to provide a device which can be easily assembled.

A further object of the present invention is to provide a simple device which can generate acoustic signals at varying depths.

Other objects and advantages of the present invention will become more obvious hereinafter in the specification and drawings.

In accordance with the present invention, a depth sensitive, mechanical, acoustic signal generating device is provided. The device consists of a spring loaded piston placed in a wall of a housing. The piston is subjected to a pressure differential between the exterior and interior of the housing such that the piston moves against the spring force and into the housing as the pressure differential, corresponding to a depth of the housing beneath a water surface, increases. As the piston moves further into the housing, it contacts a series of latches, each latch being used to detain spring loaded striker. The latches are spaced along the travel path of the piston such that each striker is associated with a specific piston movement, or depth. When the piston contacts a latch, the striker is released and strikes against a ledge within the housing, creating the acoustic signal.

The device thus described is a simple mechanical device having only four major components, i.e., a housing, a piston, strikers and latching mechanisms for the strikers. The piston is designed such that the relationship between the pressure differential at the piston and the movement of the piston into the housing is known. The latches and strikers can thus be placed along the travel path of the piston to correspond with specified water depths. The simplicity of the device allows for quick assembly, and, once assembled, the device is not subject to premature actuation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENT

Figure 1:
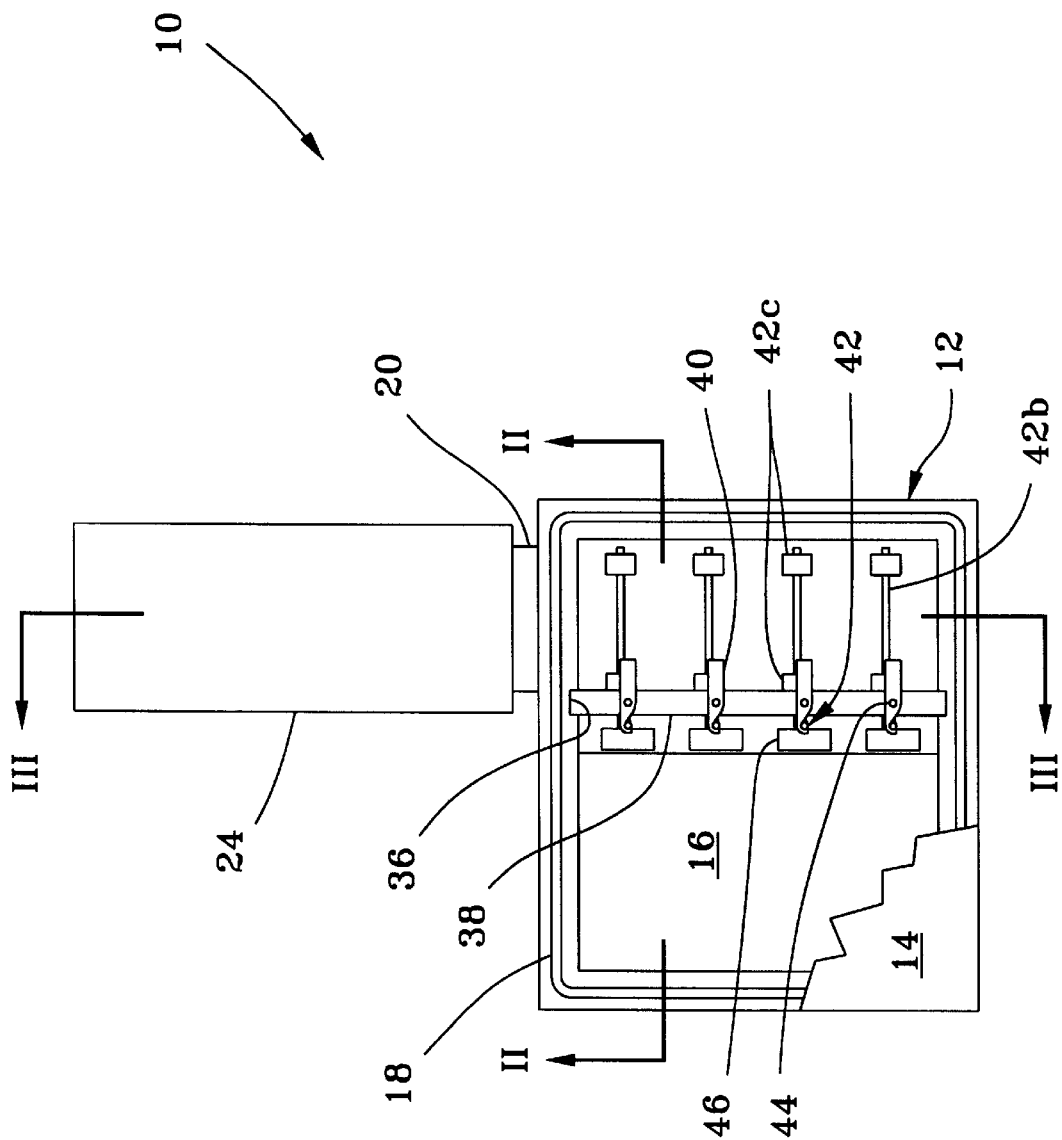
FIG. 1 is a view of a preferred embodiment of the present invention showing a cover portion partially removed.

Referring now to FIG. 1, there is shown plan view of a preferred embodiment of the present invention. Acoustic signal generating device 10 consists of a housing 12 and a cover portion 14. Cover portion 14 is shown partially removed to better reveal the interior of housing 12. Cover portion 14 is sealed against housing 12 to create chamber 16 within housing 12. As shown in FIG. 1, the seal is provided by means of gasket 18. Cover 14 can be secured to housing 12 in any manner that will provide a watertight seal against gasket 18, such as by bolting.

Figure 2:
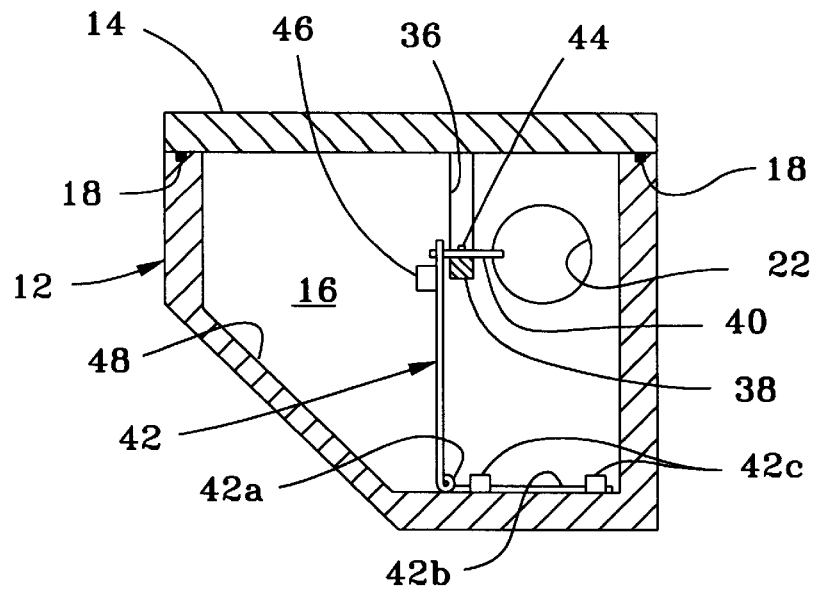
FIG. 2 is a cross sectional view of the present invention taken at line II—II of FIG. 1.
Figure 3:
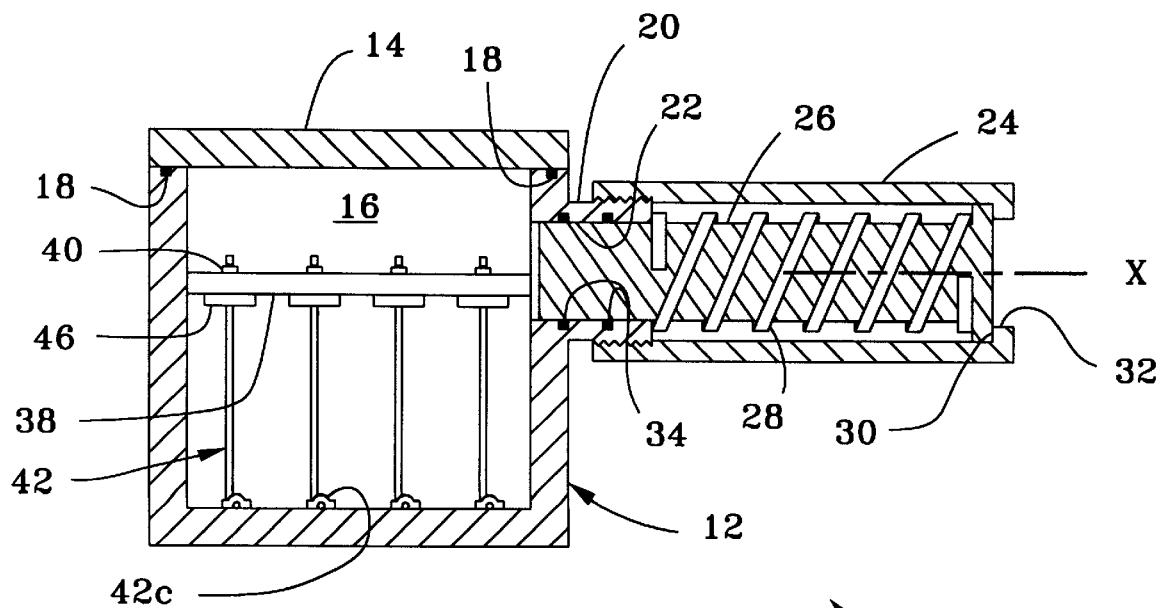
FIG. 3 is a cross sectional view of the present invention taken at line III—III of FIG. 1.

Referring now additionally to FIGS. 2 and 3, there are shown cross sectional views of device 10 taken at lines II—II and III—III of FIG. 1, respectively. One side of housing 12 has a threaded extension 20 with bore 22 passing through housing 12. Cap 24 threads onto extension 16, holding piston 26 in place within bore 22. Spring 28 biases piston 26 against end flange 30 of cap 24. End flange 30 has a bore 32, allowing water pressure against piston 26. One or more piston o-rings 34 are provided to maintain chamber 16 of housing 12 watertight. Housing 12 has notches 36 in opposite faces 12a thereof, one face 12a adjacent to extension 20 and one face 12a opposite extension 20. Notches 36 receive bar 38 therein, such that bar 38 parallels the longitudinal axis (shown as line X in FIG. 3) of piston 26. Pinned hooks 40 secure spring loaded rods 42. In the embodiment of FIGS. 1–3, four sets of hooks and rods are shown. For clarity, reference numerals are shown for only one of each of the components of the sets. When the assembled device 10 is lowered into the water, water pressure against piston 26 begins to push piston 26 against spring 28 forcing piston 26 to move through bore 22 into housing 12. As pressure increases, spring 28 becomes more and more compressed until piston 26 encounters one of the pinned hooks 40. Each pinned hook 40 restrains a spring loaded rod 42. When piston 26 strikes pinned hook 40, pinned hook 40 rotates about its pivot 44 to release spring loaded rod 42. The spring loading of rod 42 forces weight 46, attached to rod 42, to strike housing 12 at thin-walled portion 48 with sufficient force to produce the acoustic signal. For the embodiment of FIGS. 1–3, rod 42 is spring loaded by bending rod 42 in a loop 42a and attaching an end 42b of rod 42 to housing 12 by means of clips 42c. As depth increases, pressure increases, causing further compression of spring 28 and further movement of piston 26 into housing 12, where piston 26 encounters other pinned hooks 40 in turn, causing additional acoustic signals to be generated. The spring loading on rods 42 is such that once a weight 46 strikes thin-walled portion 48, weight 46 comes to rest just slightly away from thin-walled portion 48, allowing thin-walled portion 48 to vibrate when struck by other weights 46. The force exerted by spring 28 and the spacing of spring rods 42 detained by pinned hooks 40 determine the depth at which the acoustic signal is generated.

The piston and spring loaded rod mechanism of the present invention provides a simple means for mechanically generating an acoustic signal. The components are easily assembled and not subject to premature actuation due to rough handling. It can be seen that by engaging various of the spring loaded rods 42, or by changing the location of the spring loaded rods, the number of acoustic signals and depth at which the acoustic signals are generated can be varied.

Figure 4:
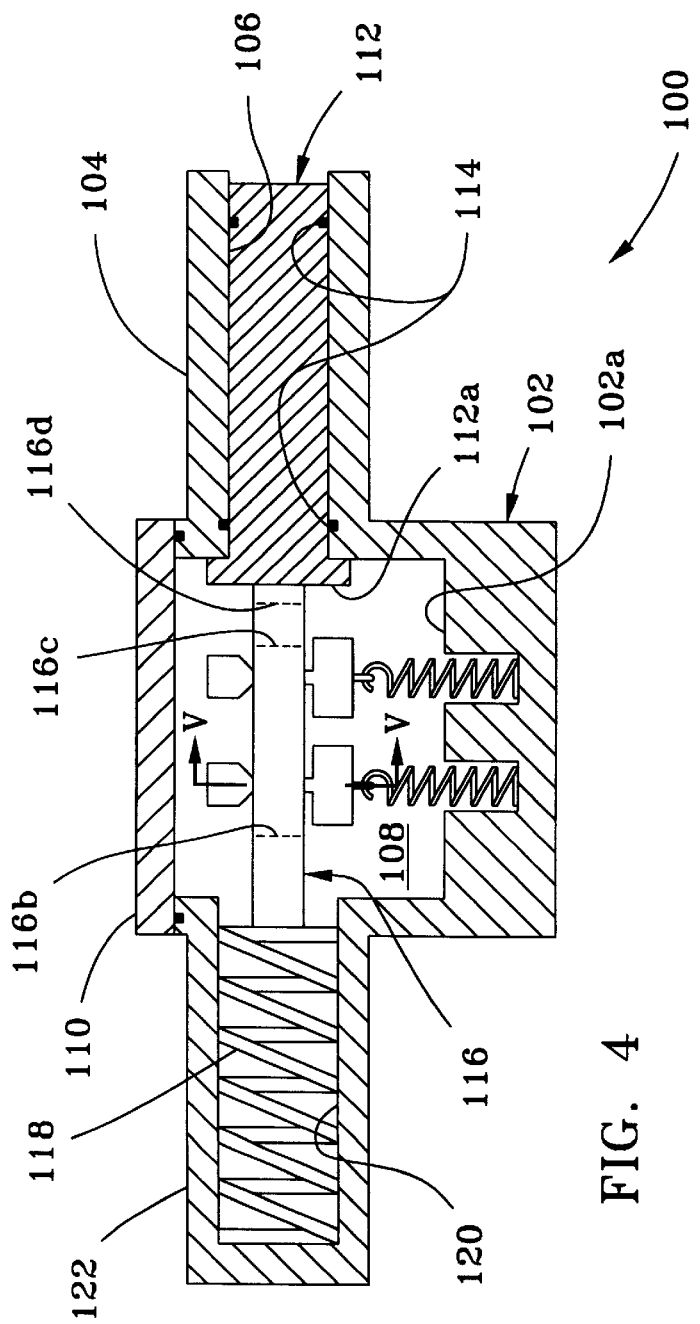
FIG. 4 is a cross sectional view of a second embodiment of the present invention.
Figure 5:
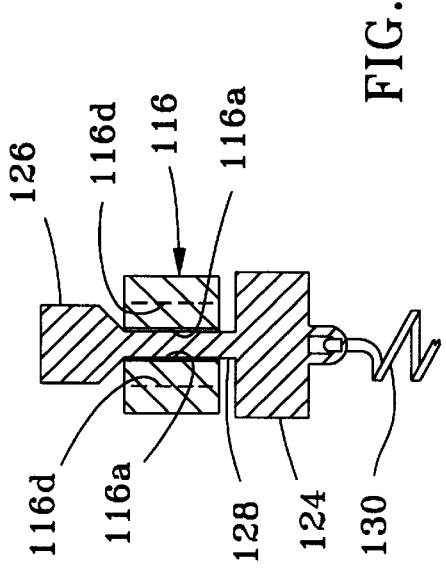
FIG. 5 is a partial cross sectional view of the second embodiment of the present invention taken at line V—V of FIG. 4.

Although the present invention has been described relative to specific embodiments thereof, it is not so limited. The spring loaded rod of the embodiment of FIGS. 1–3 can be replaced by any number of mechanisms which can be activated by the piston 26. As an example, FIG. 4 shows a cross sectional view in the manner of FIG. 3 for a second embodiment of the present invention designated as device 100. Housing 102 of device 100 is fabricated with a cylindrical extension 104 having cylindrical bore 106 passing therethrough to allow communication between inner chamber 108 within housing 102 and the environment exterior to housing 102. As in the embodiment of FIGS. 1–3, cover portion 110 seals against housing 102 to form chamber 108. Piston 112 fits within cylindrical bore 106 and, with o-ring seals 114, seals chamber 108. Piston 112 has a flange 112a at its end within chamber 108, flange 112a having a diameter larger than the diameter of cylindrical bore 106 to prevent piston 112 from passing through cylindrical bore 106. Rod 116 is attached to flange 112a and extends longitudinally from flange 112a, through chamber 108 and contacts spring 118 on the side of chamber 108 opposite extension 104. Spring 118 is contained with a second cylindrical bore 120 within a second extension 122 of housing 102. Second cylindrical bore 120 does not extend completely through second cylindrical extension 122 such that the seal of chamber 108 is maintained. It is to be noted that the embodiment of FIGS. 1–3 may be easily reconfigured to accommodate the arrangement of piston 112, rod 116 and spring 118 of FIG. 4. Referring now additionally to FIG. 5, there is shown a cross sectional view of rod 116 taken at line V-V of FIG. 4. Rod 116 has a vertical slot 116a extending completely through its depth, as shown in cross section in FIG. 5, and extending partially along its length, as indicated by phantom lines 116b and 116c in FIG. 4. The end of slot 116a nearest piston 112 expands into rod bore 116d (FIG. 5 and indicated by phantom lines 116c and 116d in FIG. 4). One or more weights 124 are attached to bar 116 by passing bulbous end 126 through rod bore 116d and sliding neck portion 128 along slot 116a, bulbous end 126 being attached to neck portion 128 which is in turn attached to weight 124. Bulbous end 126 is wider than slot 116a, but is less wide than rod bore 116d. Spring 130 attaches to weight 124, biasing weight 124 towards base 102a of housing 102. Increasing pressure of the exterior environment, corresponding to increasing in depth, forces piston 112 to move into chamber 108 pressing against rod 116 and compressing spring 118. Movement of rod 116 successively brings rod bore 116d beneath weights 124, allowing bulbous end 126 to pass through rod bore 116d. Spring 130 pulls weight 124 against base 102a with sufficient force to create an acoustic signal.

Figure 6:
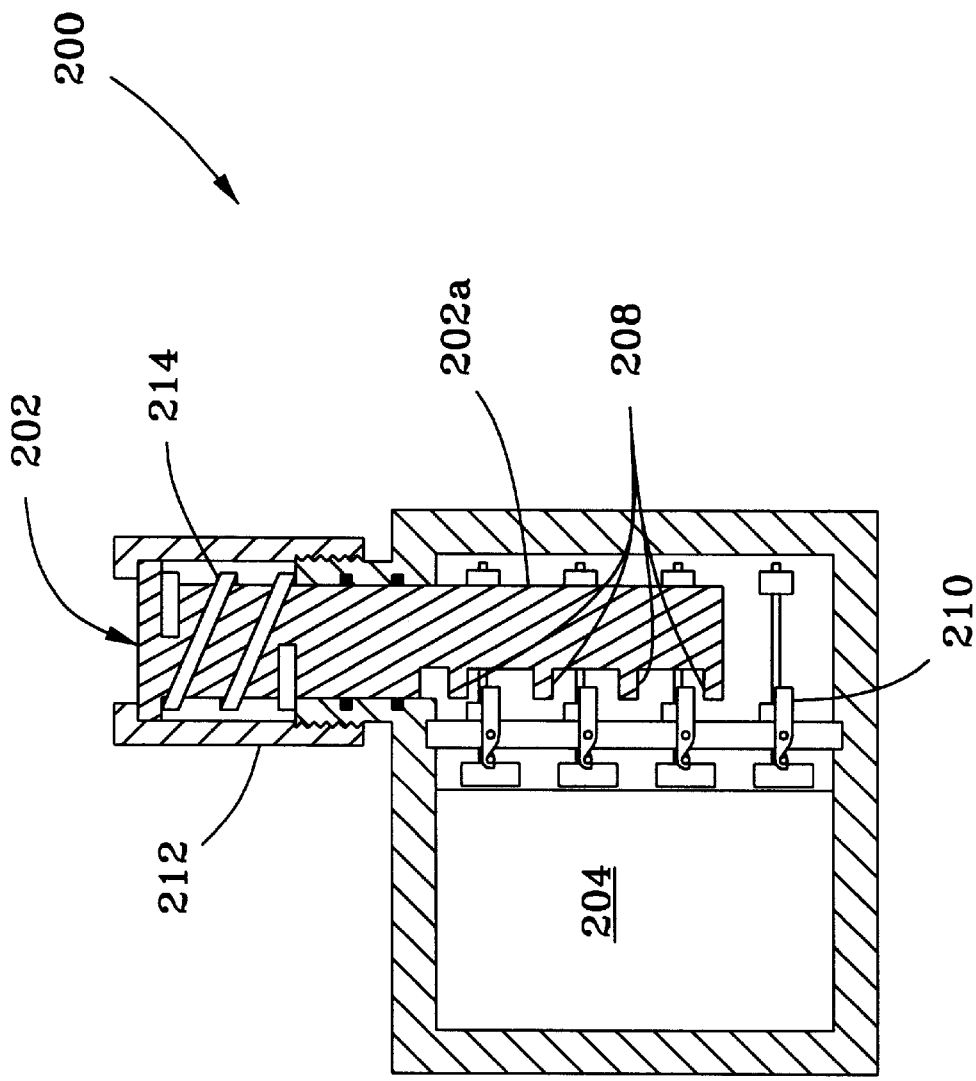
FIG. 6 is a cross sectional view of a third embodiment of the present invention.

FIG. 6 shows a cross sectional view of a third embodiment of the present invention denoted as device 200. The cross sectional view of the third embodiment of FIG. 6 is taken at a plane parallel to that in which the embodiment of FIG. 1 is shown. Piston 202 has a necked down portion 202a, which is within chamber 204 of housing 206 for the at-rest position of piston 202 shown in FIG. 6. Appendages 208 are attached to piston 202 so as to sequentially contact pinned hooks 210 in the manner as described for pinned hooks 40 of FIGS. 1–3. In the embodiment of FIG. 6, it can be seen that the total travel distance of piston 202 can be lessened when compared to the travel distance of piston 26 of the embodiment of FIGS. 1–3, making extension 212 shorter than corresponding extension 24 of the embodiment of FIGS. 1–3. The depths at which acoustic signals are generated by device 200 will depend on the force exerted by spring 214 and the placement of appendages 208.

Although the present invention has been described relative to a specific embodiment thereof, it is not so limited. For example, the biasing means for the pistons of the various embodiments may be provided by other than springs. Compression of stretching of elastomeric compounds may be used. The shapes and materials used for the housing, the extensions, the pistons and other such components may be varied to suit the manufacturing process.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for generating at least one acoustic signal, the device comprising:
   a housing having an interior chamber;
   a piston forming a movable seal between the housing chamber and an environment exterior to the housing, the piston moving with a defined relationship in response to a pressure differential between the chamber and the exterior environment;
   at least one striking means within the chamber, the striking means movable between a first restrained position and a second strike position;
   a first biasing means for the at least one striking means, the first biasing means biasing movement of the striking means in a direction from the first position to the second position; and
   a restraining means for the at least one striking means, the restraining means releasably maintaining the striking means in the first position in opposition to the biasing means, the restraining means being responsive to movement of the piston to release the striking means from the first position, the first biasing means causing the striking means to move from the first position to the strike position, the strike position generating the at least one acoustic signal.

2. The device of claim 1 wherein the housing further comprises a removable cover for providing access to the interior chamber.

3. The device of claim 1 wherein the housing further comprises a first extension forming an elongated passageway between the exterior environment and the chamber, the piston being disposed within the passageway.

4. The device of claim 3 further comprising a second biasing means biasing the movement of the piston in a direction away from the chamber, the pressure differential overcoming the second biasing means to move the piston in a direction towards and into the chamber.

5. The device of claim 4 wherein the second biasing means comprises a spring disposed about the piston and within the passageway.

6. The device of claim 4 further comprising:
   a second extension of the housing disposed opposite the first extension in relation to the chamber, the second extension forming a pocket of the chamber, the second biasing means being contained within the pocket; and
   a connecting element spanning across the chamber and connected between the second biasing means and the piston.

7. The device of claim 6 wherein the restraining means further comprises:
   a neck portion connected to the at least one striking means and extending through a slot in the connecting element; and
   a bulbous portion connected to the neck portion such that the bulbous portion and the striking means are positioned on opposite sides of the connecting element, the bulbous portion having a dimension greater than a first width of the slot to restrain the movement of the striking means, the movement of the piston causing relative movement of the connecting element and the bulbous portion, the release of the striking means being actuated by the bulbous portion passing through the slot when a second width of the slot greater than the bulbous portion dimension is aligned with the bulbous portion.

8. The device of claim 1 wherein:
   the at least one striking means comprises a weighted rod; and
   the restraining means comprises a hook engaging the weighted rod, a portion of the hook being disposed in a path of movement of the piston, contact of the piston against the hook releasing the weighted rod from the hook.

9. The device of claim 8 wherein the first biasing means comprises a bending of the weighted rod, the weighted rod exhibiting an elastic behavior tending to straighten the bending.

10. The device of claim 8 further comprising a support bar disposed within the chamber in a parallel relationship to the piston, said hook being pivotally attached to the support bar, the action of the piston against the hook pivoting the hook to release the weighted rod.

11. The device of claim 8 wherein the weighted rod contacts a strike portion of the housing in the strike position, the contact vibrating the strike portion to generate the at least one acoustic signal.

12. The device of claim 8 wherein the piston comprises an appendage for the striking means.

13. The device of claim 1 wherein the piston comprises an appendage for the striking means.

14. A device for generating acoustic signals at multiple depths beneath a water surface, the device comprising:
   a housing having an interior chamber;
   a first extension of the housing forming an elongated passageway between the water and the chamber;
   a piston disposed within the passageway and forming a movable seal between the housing chamber and the surrounding water, the piston moving with a defined relationship in response to a pressure differential between the chamber and the water, the pressure differential corresponding to the depth beneath the water surface;
   a second extension of the housing disposed opposite the first extension in relation to the chamber, the second extension forming a pocket of the chamber;
   a first biasing means disposed within the pocket, the first biasing means biasing the movement of the piston in a direction away from the chamber, the pressure differential overcoming the first biasing means to move the piston in a direction towards and into the chamber;
   a connecting bar spanning across the chamber and connected between the first biasing means and the piston, the connecting bar having a slot extending therethrough in a direction perpendicular to the spanning direction, the slot extending partially therethrough in a direction parallel to the spanning direction;
   a striking means for each acoustic signal to be generated, each striking means disposed within the chamber and movable between a first restrained position and a second strike position;
   a second biasing means for each striking means, each second biasing means biasing movement of its associated striking means in a direction from its first position to its second position;

a rod connection for each striking means, each rod connection connected to a respective one of the striking means and extending through the slot in the connecting bar; and a bulbous restraint for each striking means, each bulbous restraint connected to a respective one of the rod connections such that the bulbous restraints and each of the striking means are positioned on opposite sides of the connecting bar, the bulbous restraints each having a dimension greater than a first width of the slot to restrain each striking means in its first position, the movement of the piston causing relative movement of the connecting bar and the bulbous restraints, each of the bulbous restraints passing through the slot when a second width of the slot greater than the dimension of each of the bulbous restraints is aligned therewith, the passing of each of the bulbous restraints releasing one of the striking means from its first position, the respective second biasing means causing the released striking means to move from its first position to its strike position to generate one of the acoustic signals.

15. A device for generating acoustic signals at multiple depths beneath a water surface, the device comprising:

a housing having an interior chamber;

an extension of the housing forming an elongated passageway between the water and the chamber;

a piston disposed within the passageway and forming a movable seal between the housing chamber and the surrounding water, the piston moving with a defined relationship in response to a pressure differential between the chamber and the water, the pressure differential corresponding to the depth beneath the water surface;

a rod for each acoustic signal to be generated, each rod disposed within the chamber and movable between a first restrained position and a second strike position, each rod being bent into its first position, an elastic behavior of each rod biasing each respective rod to return to its second position;

a hook for each rod, each hook engaging one of the rods to restrain the rods in their first positions;

a support bar disposed within the chamber in a parallel relationship to the piston, each hook being pivotally attached to the support bar in a spaced apart relation;

an appendage for each hook, each appendage attached to and extending from the piston in a distinct spaced apart relationship with the hooks, a portion of each hook being disposed in a path of movement of one of the appendages, contact of the appendages against the hooks releasing the rods from the hooks, the elastic biasing of the rods returning the rods to their second positions;

a strike for each rod, each of the strikes attached to one of the rods at a location so as to contact a strike portion of the housing when the respective rod returns to its second position, each of the contacts vibrating the strike portion to generate one of the acoustic signals, the distinct spaced apart relationship of the appendages and hooks resulting in successive generation of the acoustic signal from each strike.

* * * * *